March 29, 1949.                A. M. GORFIN ET AL                2,465,446
                              DIRECT CURRENT TYPE MOTOR Filed Jan. 28, 1948                                          3 Sheets-Sheet 2

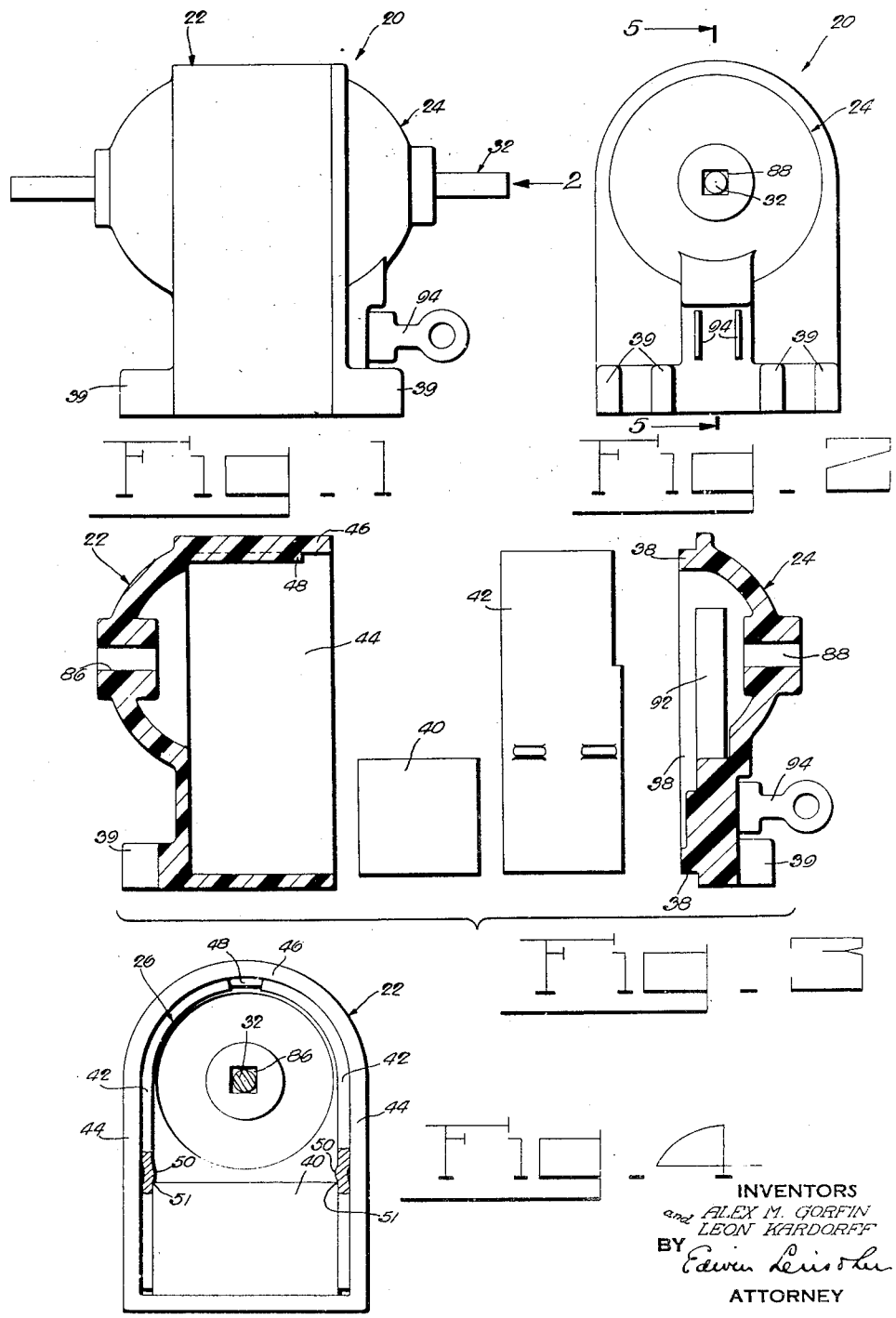

INVENTORS
ALEX M. GORFIN
LEON HARDORFF
BY Edwin Lewisohn
ATTORNEY

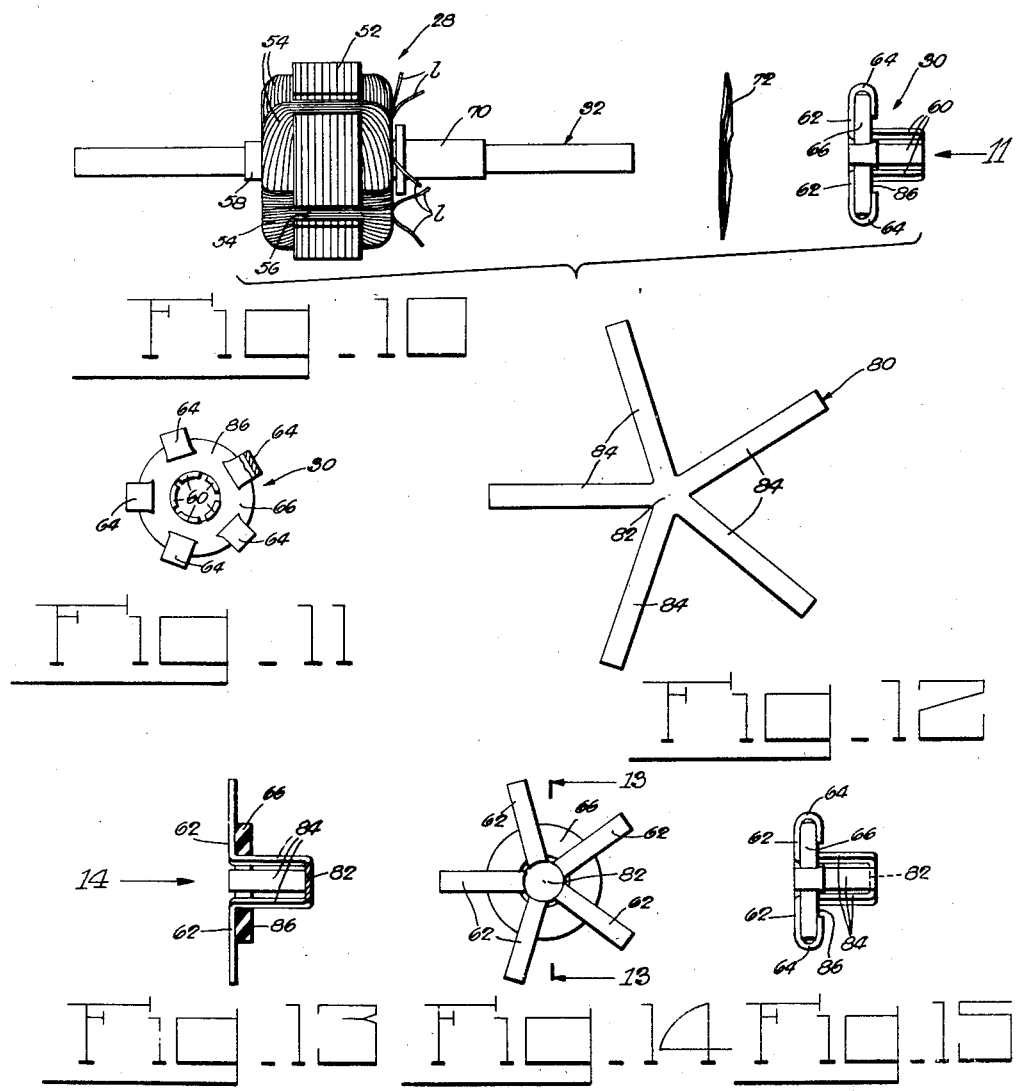

Patented Mar. 29, 1949

2,465,446

UNITED STATES PATENT OFFICE 2,465,446

DIRECT-CURRENT TYPE MOTOR

Alex M. Gorfin, New York, and Leon Kardorff, Jackson Heights, N. Y.

Application January 28, 1948, Serial No. 4,734

8 Claims. (Cl. 172—36)

This invention relates to electric motors and more particularly to miniature motors of the direct-current type. Motors of this type, which may be operated by the smallest type batteries are useful for operating many devices, such as toys, fans, mixers and certain instruments, for instance.

It is the primary aim and object of the present invention to provide a motor of this type which is simple and sturdy in construction, yet reliable and efficient in operation, and which lends itself to mass production at very low cost.

It is a more specific object of the present invention to provide a molded plastic housing for the motor in which the field is installable and the armature shaft is rotatably mountable without requiring any machining of the housing.

It is another specific object of the present invention to provide a field for the motor that is composed of separate parts, including a permanent magnet, which are securely mounted in the housing in accurate disposition therein and correct coordination with each other, by being merely pressed in place in the housing. It is another specific object of the present invention to provide for the armature of the motor a commutator which may be made, in accordance with a novel method, in mass production at extremely low cost, and which is readily mountable on the armature shaft and quickly connectable with the armature coils or windings.

It is another specific object of the present invention permanently to install in the housing commutator brushes and outside terminals leading to the latter, without requiring any machining of the housing or deformation of the installed brushes and terminals for their anchorage in the housing.

The above and other objects, features and advantages of the present invention will be more fully understood from the following description considered in connection with the accompanying illustrative drawings.

In the drawings:

Fig. 1 is a side elevation of a motor embodying the present invention;

Fig. 2 is an end elevation of the motor as viewed in the direction of the arrow 2 in Fig. 1;

Fig. 3 is a view showing the motor housing and certain parts therein disassembled, the disassembled motor housing being shown in longitudinal section;

Fig. 4 is a view into the disassembled motor housing with the field therein;

Figure 5:
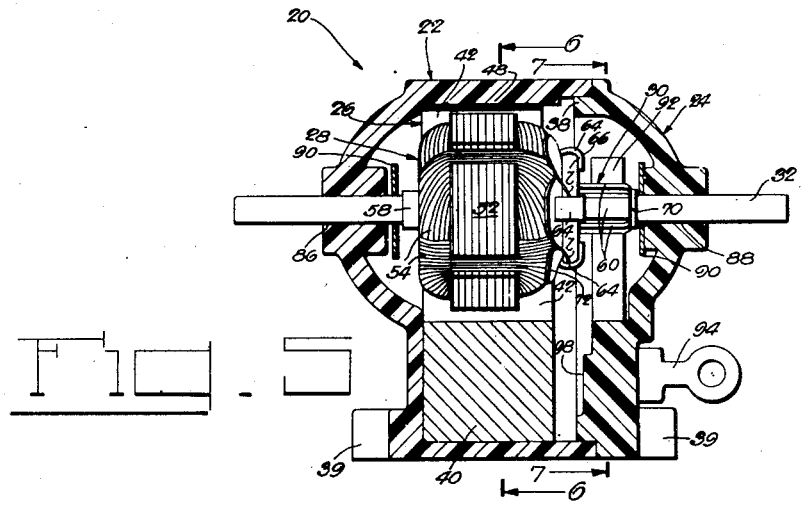
Fig. 5 is a longitudinal section through the motor as taken on the line 5—5 of Fig. 2.
Figures 6, 7:
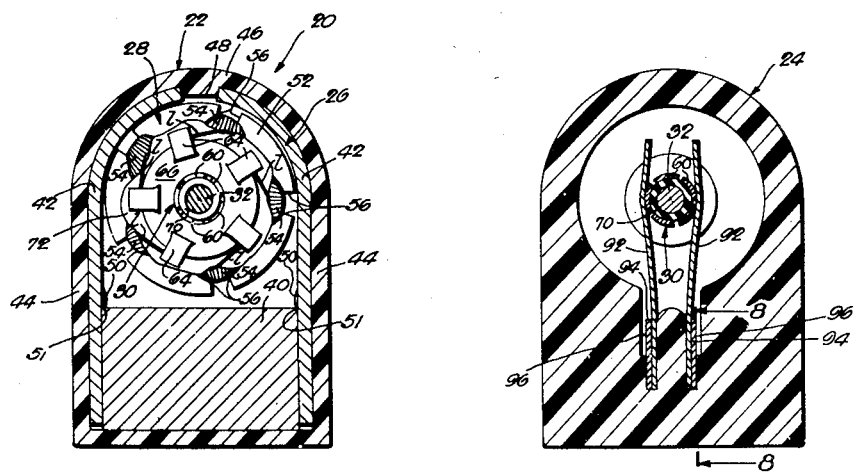
Figures 8, 9:
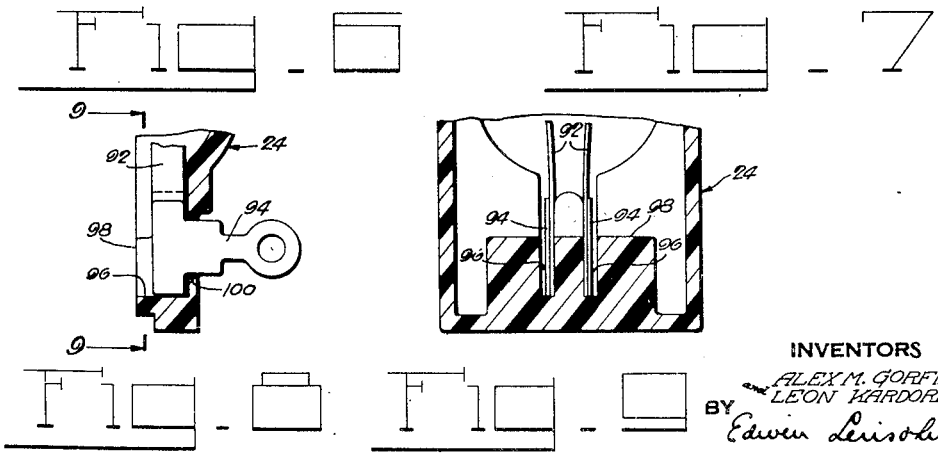

Figs. 6 and 7 are transverse sections through the motor, taken substantially on the lines 6—6 and 7—7, respectively, of Fig. 5;

Fig. 8 is a fragmentary longitudinal section through a disassembled part of the motor housing, indicating a step in the installation of the commutator brushes and terminals;

Fig. 9 is a fragmentary section through the same part of the motor housing, taken on the line 9—9 of Fig. 8;

Fig. 10 is a side-elevational view of the armature assembly of the motor with the commutator disassembled;

Fig. 11 is an end view of the commutator as viewed in the direction of the arrow 11 in Fig. 10;

Figs. 12 and 13 show progressive steps in the manufacture of the commutator;

Fig. 14 is an end view of the partly formed commutator as viewed in the direction of the arrow 14 in Fig. 13; and Fig. 15 shows the commutator near completion.

Referring to the drawings, and more particularly to Figs. 1 and 5 thereof, the reference numeral 20 designates a motor of the direct-current type, which may be considerably smaller in size than shown in the drawings and may be operated by the smallest type battery. The motor 20 comprises a housing 22, and end cover 24 over the open end of the housing 22, a field 26 and an armature 28 and commutator 30 on an armature shaft 32.

The motor housing 22 is preferably molded from any suitable plastic material and is open at one end (Fig. 3). The housing 22 is normally closed by the end cover 24 which is preferably also molded from any suitable plastic material and has a rib-like protuberance 38 which fits into the adjacent open end of the motor housing 22. Preferably, the protuberance 38 on the end cover 24 is pressfitted into the adjacent end of the housing 22 so that the cover 24 may be removed only on applying force thereto. The housing 22 as well as the end cover 24 may be provided with integral forked lugs 39 to permit the mounting of the motor by means of headed bolts (not shown).

The field 26 comprises, in the present instance, a permanent magnet 40 and opposite pole piece 42. The permanent magnet 40 is placed in the bottom of the housing 22, and the pole pieces 42 are interposed between the permanent magnet and the adjacent sides 44 of the housing 22 in the manner shown in Figs. 4 and 6. The pole pieces 42 and interposed permanent magnet 40 fit snugly in the housing 22, and the pole pieces 42 are curved at the top to coincide with the curvature of the top wall 46 of the housing 22. The housing 22 is provided at its top wall 46 with an inwardly projecting rib 48 against which the adjacent ends of the pole pieces 42 bear in the manner shown in Figs. 4 and 6. The pole pieces 42 are provided with raised beads 50 that are wedged against the adjacent top edges 51, respectively, of the permanent magnet 40, so that the portions of the inserted pole pieces 42 between the permanent magnet 40 and the rib 48 in the housing 22 are prematurely flexed into firm engagement with the adjacent wall surfaces, respectively, of the housing 22.

The armature 28 comprises a conventional laminated armature core 52 and conventional coils or windings 54 in the slots 56 of the core 52. The armature core 52 may be pressfitted over an insulating sleeve 58 on the armature shaft 32.

The commutator 30 comprises spaced parallel conductive prongs or bars 60 which at 62 radiate outwardly and are anchored at 64 on the adjacent peripheral portions of an insulating disk 66 through which the bars 60 are extended in the fashion shown best in Fig. 11. The commutator 30 is preferably pressfitted over an insulating sleeve 70 on the armature shaft 32 in close proximity to the leads 1 of the armature windings 54. Preferably interposed between the armature 28 and the commutator 30 is a ring-shaped piece 72 of any suitable fabric that effectively separates the armature windings 54 from the radiating portions 62 of the conductive commutator bars 60.

The commutator 30 is formed from a blank 80 of any suitable conductive sheet material such as copper, for instance, which has a central portion 82 and equi-angularly spaced, outwardly radiating prongs 84 (Fig. 12). The blank 80 is first formed, either by a bending operation or by an extruding operation, into the shape shown in Fig. 13, and passed through the insulating disk 66, whereupon the ends of the radiating portions 62 of the prongs 84 are bent over the periphery of the disk 66 and into firm engagement with the face 86 of the latter, thereby firmly anchoring the prongs 84 on the disk 66. It will be noted from Fig. 11 that the bent-over portions 64 of the prongs 84 are somewhat spaced from the adjacent periphery of the disk 66 for the reception therebetween of the leads 1 of the armature windings 54. For its completion, the partly-finished commutator (Fig. 15) merely requires removal of the central portion 82 from the prongs 84 in order to accomplish separation of the latter into the commutator bars 60. To this end, the central portion 82 may be punched from the partly finished commutator shown in Fig. 15. After the commutator 30 is mounted on the insulating sleeve 70 on the armature shaft 32, the leads 1 of the armature windings 54 are connected with their respective commutator bars 60 by inserting them into the spaces between the bent-over portions 64 of the latter and the periphery of the disk 66 (Fig. 11), and soldering or otherwise securing them to these bent-over bar portions 64.

The motor housing 22 and end cover 24 are provided with aligned preferably molded square holes 86 and 88, respectively, which serve as journal bearings for the armature shaft 32. The free spaces between the round armature shaft 32 and the square holes 86 and 88 (Figs. 2 and 4) may serve as receptacles for any suitable solid lubricant with which to lubricate the armature shaft 32 for a long period of operation. In order to prevent undue end play of the armature shaft 32, spacers 90 may be interposed between the journal bearings 86 and 88 and the adjacent sleeves 58 and 70, respectively, on the armature shaft 32 (Fig. 5).

The commutator brushes 92 are in the form of conductive, resilient leaves of beryllium copper, for instance, and are carried by the end cover 24 in conductive relation with terminals 94, respectively, that project to the outside of the end cover 24 for their connection with any suitable direct current source, such as a battery, for instance. The end cover 24 may be molded with two spaced grooves 96 (Figs. 8 and 9), in an inner protuberance 98 thereof, and each of these grooves 96 may communicate with the outside of the end cover 24 through a molded slot 100 in the latter (Fig. 8). The lower ends of the commutator brushes 92 are, for their mounting, initially inserted in the grooves 96, respectively, in the fashion shown in Fig. 9, and the terminals 94 are likewise inserted in these grooves so that they project through the respective slots 100 to the outside of the end cover 24 in the fashion shown in Fig. 8. The brush 92 and associated terminal 94 in each groove 96 are in conductive engagement with each other as shown in Fig. 9. After the brushes 92 and terminals 94 have thus been placed in the end cover 24, any suitable heated tool is pressed against the protuberance 98 in the end cover 24 so that some plastic material of the protuberance 98 will flow into the grooves 96 and firmly embed the brushes 92 and associated terminals 94 in the fashion shown in Fig. 7.

While we have shown and described the preferred embodiment of our invention, it will be understood that various changes may be made in the present invention without departing from the underlying idea or principles of the invention within the scope of the appended claims.

Having thus described our invention, what we claim and desire to secure by Letters Patent, is:

1. In a direct-current type motor having a field including a permanent magnet, and armature-and-commutator carrying shaft and commutator brushes, the combination of a housing in which said field is mounted, said housing being open at one end and apertured at the other end, and an end cover for said housing attached to the latter, said cover insulatingly carrying the brushes and having an aperture aligned with that in said other housing end, and said shaft being journalled in said aligned apertures.

2. In a direct-current type motor having a field including a permanent magnet, an armature-and-commutator carrying shaft and commutator brushes, the combination of a housing in which said field is mounted, said housing being open at one end and apertured at the other end, and an insulating end cover for said housing attached to the latter, said cover carrying the brushes and having an aperture aligned with that in said other housing end, and said shaft being journalled in said aligned apertures.

3. In a direct-current type motor having a field including a permanent magnet, an armature-and-commutator carrying shaft and commutator brushes, the combination of a molded plastic housing in which said field is mounted, said housing being open at one end and apertured at the other end, and a plastic end cover for said housing attached to the latter, said cover carrying the brushes and having an aperture aligned with that in said other housing end, and said shaft being journalled in said aligned apertures.

4. The combination in a direct-current type motor as set forth in claim 3, in which said apertures are square in cross section and serve also as receptacles for a solid lubricant.

5. In a direct-current type motor, the combination of a housing open at one end and having a bottom wall, opposite side walls, and a semi-cylindrical top wall into which said side walls merge tangentially and which is provided with a central, inwardly projecting longitudinal rib, and a field in said housing comprising a permanent magnet on said bottom wall and spaced from said side walls, and steel pole strips interposed with their lower ends between said magnet and side walls, respectively, each strip being shaped to extend in engagement with the adjacent side wall and continuing portion of said top wall to the rib thereof and having a raised bead wedged against the adjacent top edge of said magnet to flex the strip portion between said rib and magnet into firm engagement with the adjacent wall surfaces of said housing.

6. In a direct-current type motor having a field and an armature-and-commutator carrying shaft, the combination of a housing which is open at one end and in which said field is mounted, an insulating end cover for said housing attached to the latter, said housing and end cover providing bearings in which said shaft is journalled, and commutator brushes carried by said end cover and having electrical connections to the outside of said end cover.

7. The combination in a direct-current type motor as set forth in claim 6, in which said brushes are resilient metallic leaves embedded with one end in said end cover.

8. The combination in a direct-current type motor as set forth in claim 6, in which said brushes are resilient metallic leaves embedded with one end in said end cover, and said connections are leaf-like terminals extending to the outside of said end cover and being embedded in the latter in conductive engagement with said brushes, respectively.

ALEX M. GORFIN.
LEON KARDORFF.

REFERENCES CITED

The following references are of record in the file of this patent:

UNITED STATES PATENTS

| Number | Name | Date |
|---|---|---|
| 1,289,014 | Strohaeker | Dec. 24, 1918 |
| 1,536,328 | Caruso | May 5, 1925 |
| 1,901,955 | Gramo | Mar. 21, 1933 |
| 1,922,258 | Packer | Aug. 15, 1933 |
| 2,350,968 | Pratt | June 6, 1944 |